(12) United States Patent
Stenfelt et al.

(10) Patent No.: US 9,807,655 B2
(45) Date of Patent: Oct. 31, 2017

(54) PCRF ASSISTED APN SELECTION

(71) Applicant: Telefonaktiebolaget L M Ericsson (PUBL), Stockholm (SE)

(72) Inventors: John Stenfelt, Göteborg (SE); Hans Mattsson, Bollebygd (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/420,028

(22) PCT Filed: Feb. 14, 2014

(86) PCT No.: PCT/EP2014/052904
§ 371 (c)(1),
(2) Date: Feb. 6, 2015

(87) PCT Pub. No.: WO2015/120902
PCT Pub. Date: Aug. 20, 2015

(65) Prior Publication Data
US 2016/0029271 A1 Jan. 28, 2016

(51) Int. Cl.
*H04W 36/08* (2009.01)
*H04W 48/20* (2009.01)
(Continued)

(52) U.S. Cl.
CPC ......... *H04W 36/08* (2013.01); *H04L 41/0813* (2013.01); *H04L 65/1033* (2013.01);
(Continued)

(58) Field of Classification Search
CPC ...... H04M 15/00; H04M 15/61; H04M 15/66; H04M 15/70; H04M 15/715;
(Continued)

(56) References Cited

U.S. PATENT DOCUMENTS 6,445,924 B1 * 9/2002 Rasanen ............... H04W 36/20
455/436
6,504,828 B1 * 1/2003 Corbett ................. H04W 36/06
370/331
(Continued)

FOREIGN PATENT DOCUMENTS

CN WO 2015161817 A1 * 10/2015 ........ H04W 36/0083
SG EP 3014922 A1 * 5/2016 ........ H04W 36/0083

*Primary Examiner* — Michael Thier
*Assistant Examiner* — Eric Nowlin
(74) *Attorney, Agent, or Firm* — Rothwell, Figg, Ernst & Manbeck, P.C.

(57) ABSTRACT

The embodiments herein relate to a method in a Policy and Charging Rules Function, PCRF, node (208) for handling Access Point Names, APNs. The PCRF node receives, from a Core Network, CN, node (205), a request message comprising information indicating a first APN associated with a packet data connection. The request message is a request for a second APN being configured for a wireless device (203) arranged to communicate via the packet data connection. The PCRF node selects a configuration for the wireless device (203), and selects the second APN adapted to the selected configuration from a plurality of candidate second APNs. Each candidate second APN in the plurality comprises different configurations for the same packet data connection. The PCRF node transmits a response message to the CN node (205). The response message comprises information indicating the selected second APN.

25 Claims, 8 Drawing Sheets

(51) Int. Cl.
*H04W 88/14* (2009.01)
*H04W 8/18* (2009.01)
*H04W 72/04* (2009.01)
*H04W 76/02* (2009.01)
*H04L 12/24* (2006.01)
*H04L 29/06* (2006.01)

(52) U.S. Cl.
CPC .............. *H04W 8/18* (2013.01); *H04W 48/20* (2013.01); *H04W 72/048* (2013.01); *H04W 76/021* (2013.01); *H04W 88/14* (2013.01)

(58) Field of Classification Search
CPC ... H04M 15/8038; H04W 4/24; H04W 12/06; H04W 12/08; H04W 12/14; H04W 12/1403; H04W 12/1407; H04W 36/00; H04W 36/0022; H04W 36/0038; H04W 36/0066; H04W 36/08; H04W 36/12; H04W 36/30; H04W 48/20; H04W 72/048; H04W 76/021; H04W 88/14; H04W 8/18; H04L 41/0893; H04L 47/20; H04L 65/1033; H04L 12/14; H04L 12/1403; H04L 12/1407
See application file for complete search history.

(56) References Cited

U.S. PATENT DOCUMENTS

| | | | | |
|---|---|---|---|---|
| 8,224,325 B2* | 7/2012 | Zhang | ........... | H04W 48/16 370/329 |
| 8,621,555 B2* | 12/2013 | Zhou | ........... | H04L 12/14 726/1 |
| 8,743,812 B2* | 6/2014 | Yin | ........... | H04W 76/025 370/252 |
| 8,799,440 B2* | 8/2014 | Zhou | ........... | H04L 12/14 709/223 |
| 8,818,331 B2* | 8/2014 | Mohammed | ........... | H04M 15/70 455/406 |
| 8,848,666 B2* | 9/2014 | Keller | ........... | H04W 36/0022 370/331 |
| 8,855,045 B2* | 10/2014 | Zhou | ........... | H04W 8/082 370/326 |
| 8,867,575 B2* | 10/2014 | Mohammed | ........ | H04L 63/0428 370/546 |
| 8,958,773 B2* | 2/2015 | Mohammed | ........... | H04M 15/70 455/406 |
| 9,055,411 B2* | 6/2015 | Liang | ........... | H04W 4/08 |
| 9,106,768 B2* | 8/2015 | Mohammed | ........ | H04L 63/0428 |
| 9,137,652 B2* | 9/2015 | Zhou | ........... | H04M 15/00 |
| 9,215,549 B2* | 12/2015 | Kim | ........... | H04W 4/005 |
| 9,220,118 B1* | 12/2015 | Ramamurthy | ........ | H04W 76/02 |
| 9,288,337 B2* | 3/2016 | Mohammed | ........ | H04L 63/0428 |
| 9,509,743 B1* | 11/2016 | Mulcahy | ........... | H04L 65/608 |
| 9,560,212 B2* | 1/2017 | Stenfelt | ........... | H04L 41/5025 |
| 9,560,512 B2* | 1/2017 | Shan | ........... | H04W 74/02 |
| 9,560,584 B2* | 1/2017 | Medapalli | ........... | H04W 48/18 |
| 9,591,689 B2* | 3/2017 | Yang | ........... | H04W 76/06 |
| 2006/0126584 A1* | 6/2006 | Zhang | ........... | H04L 29/12066 370/338 |
| 2010/0202291 A1* | 8/2010 | Synnergren | ........ | H04W 76/022 370/235 |
| 2010/0223222 A1* | 9/2010 | Zhou | ........... | H04L 12/14 706/47 |
| 2010/0255808 A1* | 10/2010 | Guo | ........... | H04W 4/22 455/404.1 |
| 2011/0090852 A1 | 4/2011 | Ramle et al. | | |
| 2011/0099604 A1* | 4/2011 | Zhou | ........... | H04L 12/14 726/1 |
| 2011/0182206 A1* | 7/2011 | Cherian | ........... | H04L 12/66 370/254 |
| 2011/0268086 A1* | 11/2011 | Liang | ........... | H04W 36/0055 370/331 |
| 2012/0008523 A1* | 1/2012 | Zhou | ........... | H04L 12/14 370/252 |
| 2012/0064895 A1* | 3/2012 | Zhang | ........... | H04W 48/16 455/436 |
| 2012/0069763 A1* | 3/2012 | Zhao | ........... | H04W 28/24 370/252 |
| 2012/0084246 A1* | 4/2012 | Zhou | ........... | H04L 12/14 706/47 |
| 2012/0102174 A1* | 4/2012 | Zhou | ........... | H04L 12/14 709/223 |
| 2012/0147839 A1* | 6/2012 | Yin | ........... | H04W 76/025 370/329 |
| 2012/0246325 A1 | 9/2012 | Pancorbo Marcos et al. | | |
| 2012/0250611 A1* | 10/2012 | Yang | ........... | H04W 76/06 370/328 |
| 2012/0300638 A1* | 11/2012 | Zhou | ........... | H04W 8/082 370/236 |
| 2013/0195076 A1* | 8/2013 | Keller | ........... | H04W 36/0022 370/331 |
| 2013/0250838 A1* | 9/2013 | Liang | ........... | H04W 4/08 370/312 |
| 2013/0286985 A1 | 10/2013 | Yin et al. | | |
| 2013/0308604 A1* | 11/2013 | Jiang | ........... | H04W 48/20 370/331 |
| 2013/0336210 A1* | 12/2013 | Connor | ........... | H04W 4/003 370/328 |
| 2014/0199962 A1* | 7/2014 | Mohammed | ........... | H04M 15/70 455/406 |
| 2014/0226470 A1* | 8/2014 | Kim | ........... | H04W 28/0268 370/230 |
| 2014/0226641 A1* | 8/2014 | Kim | ........... | H04W 4/005 370/338 |
| 2014/0335830 A1* | 11/2014 | Wu | ........... | H04W 60/00 455/411 |
| 2014/0357222 A1* | 12/2014 | Mohammed | ........... | H04M 15/70 455/406 |
| 2015/0036489 A1* | 2/2015 | Rajadurai | ........ | H04W 28/0205 370/230 |
| 2015/0036496 A1* | 2/2015 | Shan | ........... | H04W 74/02 370/235 |
| 2015/0071143 A1* | 3/2015 | Wang | ........... | H04W 76/062 370/311 |
| 2015/0103664 A1* | 4/2015 | Shan | ........... | H04W 24/10 370/235 |
| 2015/0117425 A1* | 4/2015 | Gupta | ........... | H04L 5/0032 370/338 |
| 2015/0312831 A1* | 10/2015 | Sang | ........... | H04W 36/0083 370/236 |
| 2016/0029247 A1* | 1/2016 | Shan | ........... | H04W 36/0066 370/235 |
| 2016/0050585 A1* | 2/2016 | Shan | ........... | H04B 7/0456 370/235 |
| 2016/0080578 A1* | 3/2016 | Stenfelt | ........... | H04L 41/5025 455/406 |
| 2016/0337896 A1* | 11/2016 | Rajagopalan | ....... | H04L 41/0893 |
| 2016/0352800 A1* | 12/2016 | Mulcahy | ............... | H04L 65/608 |
| 2016/0366061 A1* | 12/2016 | Renzullo | ........... | H04L 45/304 |
| 2017/0006503 A1* | 1/2017 | Panaitopol | ........... | H04W 88/04 |
| 2017/0019750 A1* | 1/2017 | Palanisamy | ......... | H04W 76/066 |
| 2017/0041968 A1* | 2/2017 | Jin | ........... | H04W 76/00 |

* cited by examiner

PCRF ASSISTED APN SELECTION

CROSS REFERENCE TO RELATED APPLICATION(S)

This application is a 35 U.S.C. §371 National Phase Entry Application from PCT/EP2014/052904, filed Feb. 14, 2014, designating the United States, the disclosure of which is incorporated herein in its entirety by reference.

TECHNICAL FIELD

Embodiments herein relate generally to a Policy and Charging Rules Function (PCRF) node, a method in the PCRF node, a Core Network (CN) node, a method in the CN node, a computer program product and a computer program. More particularly the embodiments herein relate to handling Access Point Names (APNs).

BACKGROUND

An APN, short for Access Point Name, is an identifier for a Packet Data Network (PDN). In other words, the APN identifies the PDN that a user of a wireless device wants to communicate with. The APN may also be used to define a type of service that is provided by the APN. The APN is used in both the General Packet Radio Service (GPRS) and the Evolved Packet System (EPS).

Very often, PDN connections or Packet Data Protocol (PDP) contexts for a certain APN have different needs with regards to functionality that is required in the PDN-Gate-Way/Gateway General packet radio service Support Node (PDN-GW/GGSN) or in any other nodes that may be located on the Gi/SGi interface e.g. a node implementing a Traffic Detection Function (TDF). This may be due to the fact that many network operators may want to provide differentiation in their service offerings to the end users or they may for other reasons want to treat the PDN-connections or PDP contexts differently based on a number of different factors such as location of the wireless device, time-of-day/day-of-week, accumulated data usage for some time, wireless device type etc. For example for the ordinary Internet APN:

- Some users may have pre-paid subscriptions that require Online Charging to be enabled, while other users may be post-paid and do not have the need for Online Charging. However Online Charging is a GW function that is typically enabled/disabled per APN, although the function as such is very resource consuming for the GW.
- Some users, i.e. children, may require content-filtering/parental control to be enabled for their subscriptions. Typically this is a very low percentage of all users (e.g. <5%).
- Some users may have flat-rate subscriptions that are independent of which service that is used, while other users may e.g. only be allowed to access certain services for free while others are paid for per megabyte. For the latter, service awareness is required in the PDN-GW/GGSN or TDF and therefore Packet Inspection and Service Classification (PISC) needs to be enabled for the entire APN. PISC is a very resource consuming function for the PDN-GW/GGSN and the TDF.
- Also, within the domain of packet inspection there are differences. PISC may be used for policy and charging, which requires one set of filter configuration. PISC may also be used e.g. to obtain service usage statistics for the purpose of analytics, for example to get a list of the most popular domains accessed (Uniform Resource Locators (URLs)), and this may require a different (more granular) filter configuration.

The above listed functions are all examples of functionality that is typically configured per APN in the PDN-GW/GGSN and the TDF. This means that in case some users that may access this APN may use the function, then the function must be enabled.

The Gi and SGi interfaces mentioned above will now be briefly explained. The SGi interface connects the PDN-GW to an external network (e.g. a PDN) for the EPS e.g. for Long Term Evolution (LTE) access. The Gi interface connects the GGSN to an external network (e.g. PDN) for GPRS access.

PCC Architecture in 3GPP

The architecture that supports Policy and Charging Control (PCC) functionality is depicted in FIG. 1. This figure has been taken from TS 23.203 (V.12.2.0) that specifies the PCC functionality for Evolved Third Generation Partnership Project (3GPP) Packet Switched domain, including both 3GPP accesses (GERAN/UTRAN/E-UTRAN) and Non-3GPP accesses. GERAN is short for GSM EDGE Radio Access Network, GSM is short for Global System for Mobile communications and EDGE is short for Enhanced Data rates for GSM Evolution. UTRAN is short for UMTS Terrestrial Radio Access Network, UMTS is short for Universal Mobile Telecommunications System and E-UTRAN is short for Evolved-UTRAN.

The PCRF 101 is a functional element that encompasses policy control decision and flow based charging control functionalities. The PCRF 101 provides network control regarding the service data flow detection, gating, Quality of Service (QoS) and flow based charging (except credit management) towards a Policy and Charging Enforcement Function (PCEF) 103. The PCRF 101 receives session and media related information from an Application Function (AF) 105 and informs the AF 105 of traffic plane events.

The PCRF 101 shall provision PCC rules to the PCEF 103 via the Gx reference point 106. The PCRF 101 shall provision Application Detection and Control (ADC) rules to a TDF 108 via the Sd reference point 109.

The PCRF 101 shall inform the PCEF 103 and TDF 108 through the use of PCC and ADC rules on the treatment of each service data flow that is under PCC/ADC control, in accordance with the PCRF 101 policy decision(s).

The AF 105 is an element offering applications in which service is delivered in a different layer (i.e. transport layer) from the one where the service has requested the control of Internet Protocol (IP) bearer resources according to what has been negotiated (i.e. signaling layer). One example of an AF 105 is the Proxy-Call Session Control Function (P-CSCF) of the IP Multimedia (IM) CN subsystem. The AF 105 shall communicate with the PCRF 101 to transfer dynamic session information (i.e. description of the media to be delivered in the transport layer). This communication is performed using the Rx interface 110.

The PCEF 103 encompasses service data flow detection (based on the filter definitions included in the PCC and ADC rules), as well as online and offline charging interactions (not described here) and policy enforcement. Since the PCEF 103 is the entity handling the bearers it is where the QoS is being enforced for the bearer according to the QoS information coming from the PCRF 101. This functional entity is located at the gateway (e.g. GGSN in the GPRS case, and PDN-GW in the EPS case). For the cases where there is Proxy Mobile IPv6 (PMIP) instead of GPRS Tunneling Protocol (GTP) protocol between a Bearer Binding and Event Reporting Function (BBERF) 113 and the PCEF 103, the bearer control is done in the BBERF 113 instead. Gxx 115 is the interface between the BBERF 113 and the PCRF 101.

The Sp interface 118 lies between the PCRF 101 and a Subscription Profile Repository (SPR) 120. The Gy reference point 123 resides between an Online Charging System (OCS) 125 and the PCEF 103. The Gy reference point 123 allows online credit control for service data flow based charging. The Gz reference point 128 resides between the PCEF 103 and an Offline Charging System (OFCS) 130. The Gz reference point 128 enables transport of service data flow based offline charging information. The Sy reference point 133 resides between the PCRF 101 and the OCS 125. The Sy reference point 133 enables transfer of policy counter status information relating to subscriber spending from the OCS 125 to the PCRF 101. The Gyn reference point 135 resides between the OCS 125 and the TDF 108, and allows online credit control for charging in case of ADC rules based charging in the TDF 108. The Gzn reference point 138 resides between the TDF 108 and the OFCS 130 and enables transport of offline charging information in case of ADC rule based charging in TDF 108.

APN Selection in the MME/SGSN

The APN may be provided from the wireless device to the Mobility Management Entity-Serving GPRS Support Node (MME-SGSN) during an Initial Attach request or a PDN-connectivity Request for LTE access and in the PDP-context activation request for Wideband Code Division Multiple Access (WCDMA) and GSM access. A default APN may also be provided from a Home Subscriber Server (HSS) (for WCDMA access) or a Home Location Register (HLR) (for GSM access).

A Default APN may be defined as the APN which is marked as default in the subscription data and used during the Attach procedure and the PDN connectivity procedure requested by the wireless device when no APN is provided by the wireless device.

The term MME-SGSN may refer to a MME, a SGSN or a combined MME and SGSN node.

If one of the PDN subscription contexts provided by the HSS comprises a wild card APN, a PDN connection with dynamic address allocation may be established towards any APN requested by the wireless device. A wild card APN does not specify a specific APN.

If the wireless device provides an APN, this APN shall be employed for default bearer activation.

The selected APN is used, typically via a Domain Name Server (DNS)-lookup, to identify which PDN-GW/GGSN that the PDN-connection shall be assigned to. It will also in that PDN-GW/GGSN, based on local configuration, be used to determine what GW-functions that will be assigned to the PDN-connection there. For a certain APN multiple supporting PDN-GW/GGSNs may be defined enabling a scalability and redundancy.

Many functions in the PDN-GW/GGSN and in the TDF are enabled and disabled per APN. Due to the fact that functional requirements for different PDN-connections/PDP-contexts for the same APN are not homogenous it is hard to optimize the performance of the APN and the nodes.

SUMMARY

An objective of embodiments herein is therefore to provide improved handling of APNs.

According to a first aspect, the object is achieved by a method in a PCRF node for handling APNs. The PCRF node receive, from a CN node, a request message comprising information indicating a first APN associated with a packet data connection. The request message is a request for a second APN being configured for a wireless device arranged to communicate via the packet data connection. The PCRF node selects a configuration for the wireless device. The PCRF node selects the second APN adapted to the selected configuration from a plurality of candidate second APNs. Each candidate second APN in the plurality comprises different configurations for the same packet data connection. The PCRF node transmits a response message to the CN node. The response message comprises information indicating the selected second APN.

According to a second aspect, the object is achieved by a method in a CN node for handling APNs. The CN node transmits, to the PCRF node, a request message comprising information indicating a first APN associated with a packet data connection. The request message is a request for a second APN being configured for a wireless device arranged to communicate via the packet data connection. The CN node receives a response message from the PCRF node. The response message comprises information indicating a selected second APN.

According to a third aspect, the object is achieved by a PCRF node for handling APNs. The PCRF node being adapted to receive, from the CN node, a request message comprising information indicating a first APN associated with a packet data connection. The request message is a request for a second APN being configured for a wireless device arranged to communicate via the packet data connection. The PCRF node is further adapted to select a configuration for the wireless device and to select the second APN adapted to the selected configuration from a plurality of candidate second APNs. Each candidate second APN in the plurality comprises different configurations for the same packet data connection. The PCRF node is adapted to transmit a response message to the CN node. The response message comprises information indicating the selected second APN.

According to a fourth aspect, the object is achieved by a CN node for handling APNs. The CN node is adapted to transmit, to the PCRF node, a request message comprising information indicating a first APN associated with a packet data connection. The request message is a request for a second APN being configured for a wireless device arranged to communicate via the packet data connection. The CN node is further adapted to receive a response message from the PCRF node. The response message comprises information indicating a selected second APN.

Since the PCRC node selects a second APN which is adapted to the particular selected configuration of the wireless device for the packet data connection, an APN which is functionality optimized for each packet data connection is selected instead of using an APN having several functions which will not be used by the wireless device. Thus, improved handling of APNs is improved.

Embodiments herein afford many advantages, of which a non-exhaustive list of examples follows:

The possibility for the PCRF node to influence the APN selection already in the CN node allows for a selection of alternative APNs towards the same destination PDN in the gateway that has been optimally configured with regards to performance and required functionality for the user session. The aggregated effect on gateway performance gains may be significant since e.g. only those PDN-connections/PDP-contexts that require service awareness are directed towards APNs that have PISC enabled, while PDN-connections that do not require service awareness are directed to APNs that do not have PISC enabled. Another example is that only PDN-connections/PDP-contexts that require Online (or offline) charging are directed to APNs that has this functionality enabled.

Furthermore, only PDN-connections/PDP-contexts that require further processing in a TDF are directed to APNs that have packet forwarding to a (specific) enabled TDF. The embodiments herein are superior to that of the existing Remote Authentication Dial In User Service (RADIUS) assisted APN selection, since no RADIUS server with access to an external policy data base is needed. The PCRF node is the most advantageous node for taking the decision on which Gi/SGi APN that should be selected in the gateway.

Another advantage of the embodiments herein is that they will also enable the possibility select different gateways depending on the level of policy enforcement needed for PDN-connection/PDP-context. For example, PDN-connections requiring online charging or service awareness are directed to a different gateway then those which do not require these functions.

The embodiments herein may be associated with Software Defined Network (SDN) and service chaining and may be a bridge in future network deployment scenarios when the PCRF node needs to interact also with legacy (centralized) node architectures, The embodiments herein are not limited to the features and advantages mentioned above. A person skilled in the art will recognize additional features and advantages upon reading the following detailed description.

BRIEF DESCRIPTION OF THE DRAWINGS

The embodiments herein will now be further described in more detail in the following detailed description by reference to the appended drawings illustrating the embodiments and in which.

The drawings are not necessarily to scale and the dimensions of certain features may have been exaggerated for the sake of clarity. Emphasis is instead placed upon illustrating the principle of the embodiments herein.

DETAILED DESCRIPTION

The embodiments herein relate to allowing a PCRF to assist a CN node in the APN selection through the use of an external and direct interface between the CN node and the PCRF.

Figure 1:
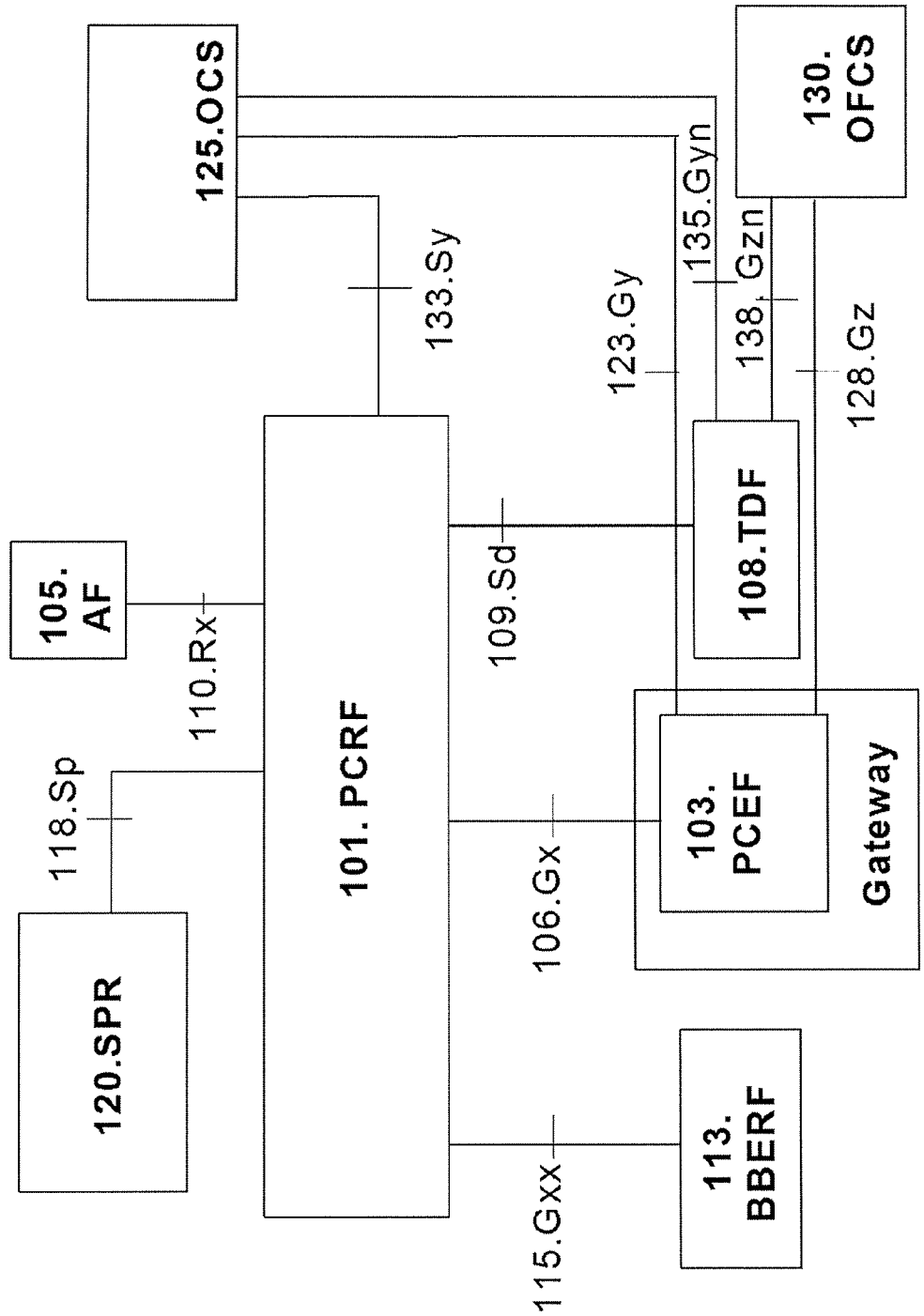
FIG. 1 is a schematic block diagram illustrating embodiments of a PCC architecture.
Figure 2:
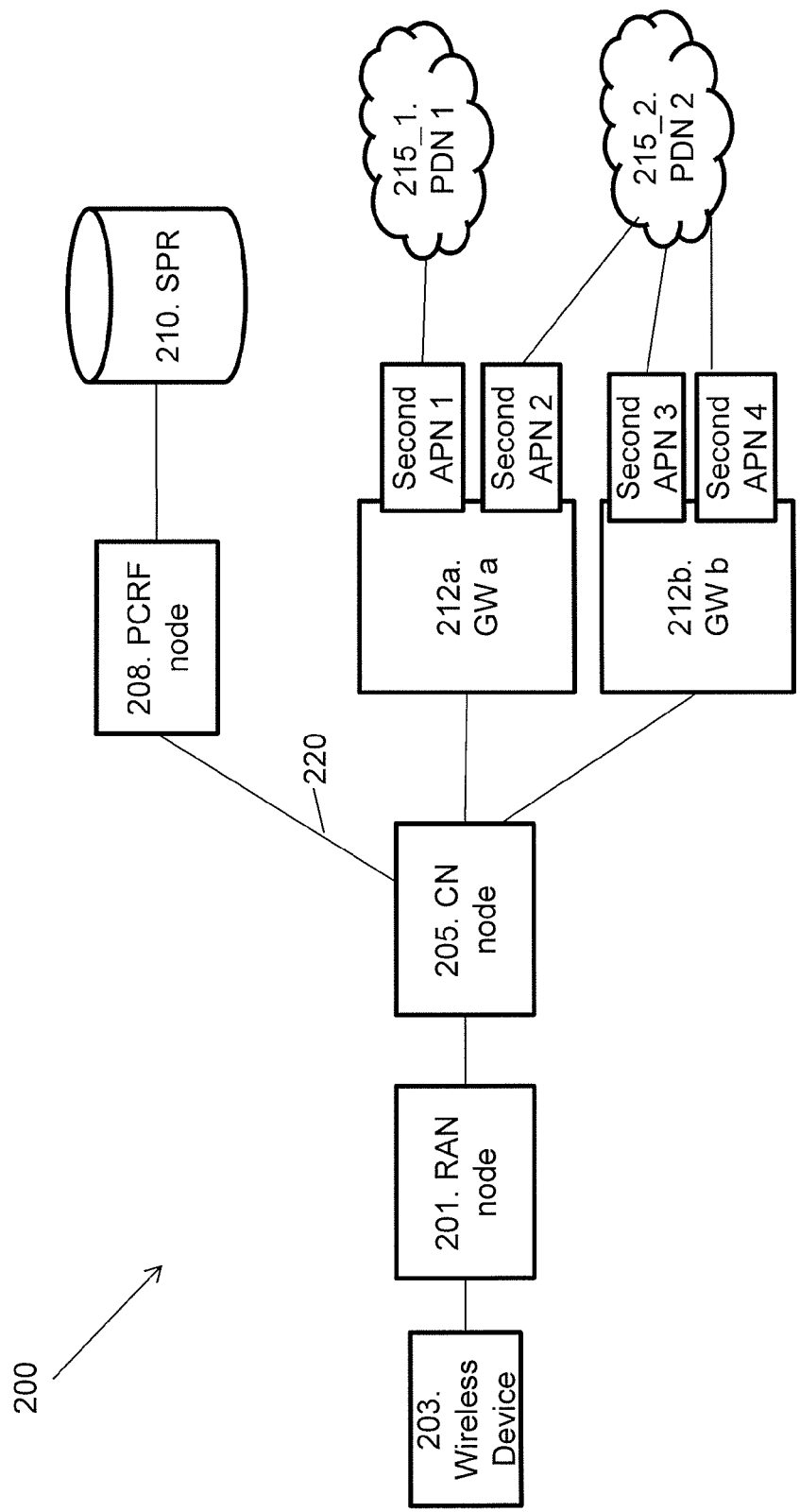
FIG. 2 is a schematic block diagram illustrating embodiments of a communications system.

FIG. 2 depicts a communications system 200 in which embodiments herein may be implemented. The communications network 200 may in some embodiments apply to one or more radio access technologies such as for example LTE, LTE Advanced, WCDMA, GSM, any other 3GPP radio access technology or other radio access technologies such as e.g. Wireless Local Area Network (WLAN).

The communications system 200 comprises a Radio Access Network (RAN) node 201. The RAN node 201 may be a base station such as a NodeB, an evolved NodeB (eNB), a WLAN Access Point or any other RAN unit adapted to communicate over a radio carrier with a wireless device 203. The RAN node 201 is located in a radio access network.

The wireless device 203 may be a device by which a subscriber may access services offered by an operator's network and services outside operator's network to which the operator's RAN and CN provide access, e.g. access to the Internet. The wireless device 203 may be any device, mobile or stationary, enabled to communicate in the communications network, for instance but not limited to e.g. user equipment, mobile phone, smart phone, sensors, meters, vehicles, household appliances, medical appliances, media players, cameras, Machine to Machine (M2M) device, Device to Device (D2D) device, Internet of Things (IoT) unit or any type of consumer electronic, for instance but not limited to television, radio, lighting arrangements, tablet computer, laptop or Personal Computer (PC). The wireless device 203 may be portable, pocket storable, hand held, computer comprised, or vehicle mounted devices, enabled to communicate voice and/or data, via the radio access network, with another entity, such as another wireless device or a server.

The RAN node 201 is adapted to communicate with a CN node 205. The CN node 205 is located in a core network. The CN node 205 may be for example a SGSN, a MME, a combined MME/SGSN or a Trusted Wireless local area network Access Gateway (TWAG). The CN node 205 is a TWAG in case the communications system 200 is a WLAN.

The CN node 205 is adapted to be connected to a PCRF node 208. As mentioned earlier, the PCRF node 208 encompasses policy control decision and flow based charging control functionalities. The PCRF node 208 is adapted to be connected to a SPR 210. The SPR 210 is adapted to store subscriber and subscription information per PDN or PDP basis. The information stored in the SPR 210 may be e.g. subscriber's allowed service, information on subscriber's allowed QoS (e.g. Maximum Bit Rate (MBR) and Guaranteed Bit Rate (GBR)), subscriber's charging related information and subscriber category.

The PCRF node 208 is adapted to be connected to at least one GW 212. In FIG. 2, an example is shown where the PCRF node 212 is adapted to be connected to two GWs, GW a 212a and GW b 212b, however any other suitable number of GWs is applicable. In the following, the reference number 212 refers to any of the GWs. The GW 212 may be a GGSN or a PDN-GW. The GW 212 is associated with at least one PDN 215. The GW 212 comprises at least one second APN. In FIG. 2, GW a 212a is exemplified to comprise second APN 1 and second APN 2 and GW b 212b is exemplified to comprise second APN 3 and second APN 4. The second APN 1 is associated with PDN 1 215_1 and the second APN2, the second APN3 and the second APN 4 are all associated with PDN 2 215_2. Thus the second APN's of a GW 212 may be associated with one or more PDNs. In the following, the reference number 215 refers to any of the PDNs.

The CN node 205 and the PCRF node 208 may have a direct interface 220 between them.

It should be noted that the communication links in the communications system 200 may be of any suitable kind including either a wired or wireless link. The link may use any suitable protocol depending on type and level of layer (e.g. as indicated by the Open Systems Interconnection (OSI) model) as understood by the person skilled in the art.

The method for handling APNs according to some embodiments will now be described with reference to the signalling diagram depicted in FIG. 3. The method comprises the following steps, which steps may as well be carried out in another suitable order than described below.

Step 301

In some embodiments, the wireless device 203 transmits information indicating a first APN to the CN node 205, i.e. the wireless device 203 has decided the first APN. The first APN is associated with a packet data connection. The packet data connection may either be a PDN connection or a PDP context. The first APN may also be referred to as an original APN.

Step 302

In some embodiments, the CN node 205 determines the first APN. In an embodiment where step 301 has taken place, the CN node 205 may determine another first APN based on the received information indicating the first APN. In another embodiment where step 301 has taken place, the CN node 205 determines that the first APN received from the wireless device 203 is acceptable and does not perform any new determination of first APN.

In an embodiment where step 301 is not performed, the CN node 205 determines the first APN by itself, i.e. without any suggestion to first APN from the wireless device 203.

Step 303

Regardless of who has determined the first APN, the CN node 205 transmits a request message to the PCRF node 208. The request message comprises information indicating the first APN associated with a packet data connection. The request message is a request for a second APN being configured for the wireless device 203 which is arranged to communicate via the packet data connection. The request message may be transmitted using the direct interface 220 between the PCRF node 208 and the CN node 205. The second APN may also be referred to as a configured APN, a proposed APN or a mirror APN.

Step 304

In some embodiments, after having received the request message in step 303, the PCRF node 208 obtains subscription information associated with the wireless device 203. In some embodiments, the PCRF node 208 obtains the subscription information from the SPR 210, as indicated with the arrow 304 in FIG. 3.

Step 305

The PCRF node 208 selects a configuration for the wireless device 203.

A configuration may be at least one of a configuration for content filtering, online charging, offline charging, packet forwarding to a TDF packet inspection, quality of service, bandwidth control, header enrichment, transport optimization, content optimization, access-control, measurements, monitoring, security etc.

Step 306

The PCRF Node 208 comprises a plurality of candidate second APNs and each candidate second APN in the plurality comprises different configurations for the same packet data connection. The PORE node 208 selects the second APN adapted to the configuration selected in step 305 from the plurality of candidate second APNs. The second APN may be selected based on at least one of the subscription information and other parameters associated with the wireless device 203. The other parameters may be a wireless device type, the location of the wireless device 203, or any other suitable parameter known to the PCRF node 208.

Step 307

The PCRF node 208 transmits a response message back to the CN node 205, as a response to the request message in step 303. The response message comprises information indicating the selected second APN. The response message may be transmitted using the direct interface 220 between the PCRF node 208 and the CN node 205.

Step 308

In some embodiments and in case the CN node 205 is connected to a plurality of gateways 212, the CN node 205 obtains, for the packet data connection, information indicating which of the gateways 212a, 212b that should be the gateway for the communication of the wireless device 203 via the packet data connection. The CN node 205 obtains this information based on the selected second APN received from the PCRF node 208. The CN node 205 may obtain this information in different ways, for example by performing an internal determination process of which gateway to use or by receiving information from another node which has determined which gateway to use.

During the second APN evaluation in order to determine which gateway 212, e.g. which gateway IP-address, a packet data connection shall be connected to may be done by a DNS then by the CN node 205, e.g. SGSN/MME. The relation between the second APN and the gateway IP address to be used may be configured in the DNS. If there are multiple gateway IP addresses configured for a second APN in the DNS and those on request are returned to the CN node 205, the CN node 205 may determine which of these addresses to actually use.

The second APN as such may be used as a basis to determine the gateway IP-address and it may be the CN node 205 that enforces that decision. The determination of which gateway 212, e.g. which gateway IP-address to use, may be performed both (a) inside the CN node 205, e.g. MME/SGSN, (b) outside the CN node 205 (in the DNS) and (c) as a combination of a) and b).

Step 309

In some embodiments, the CN node 205 transmits information indicating the selected second APN to the gateway 212 that should be the gateway for the communication of the wireless device 203.

Figure 4:
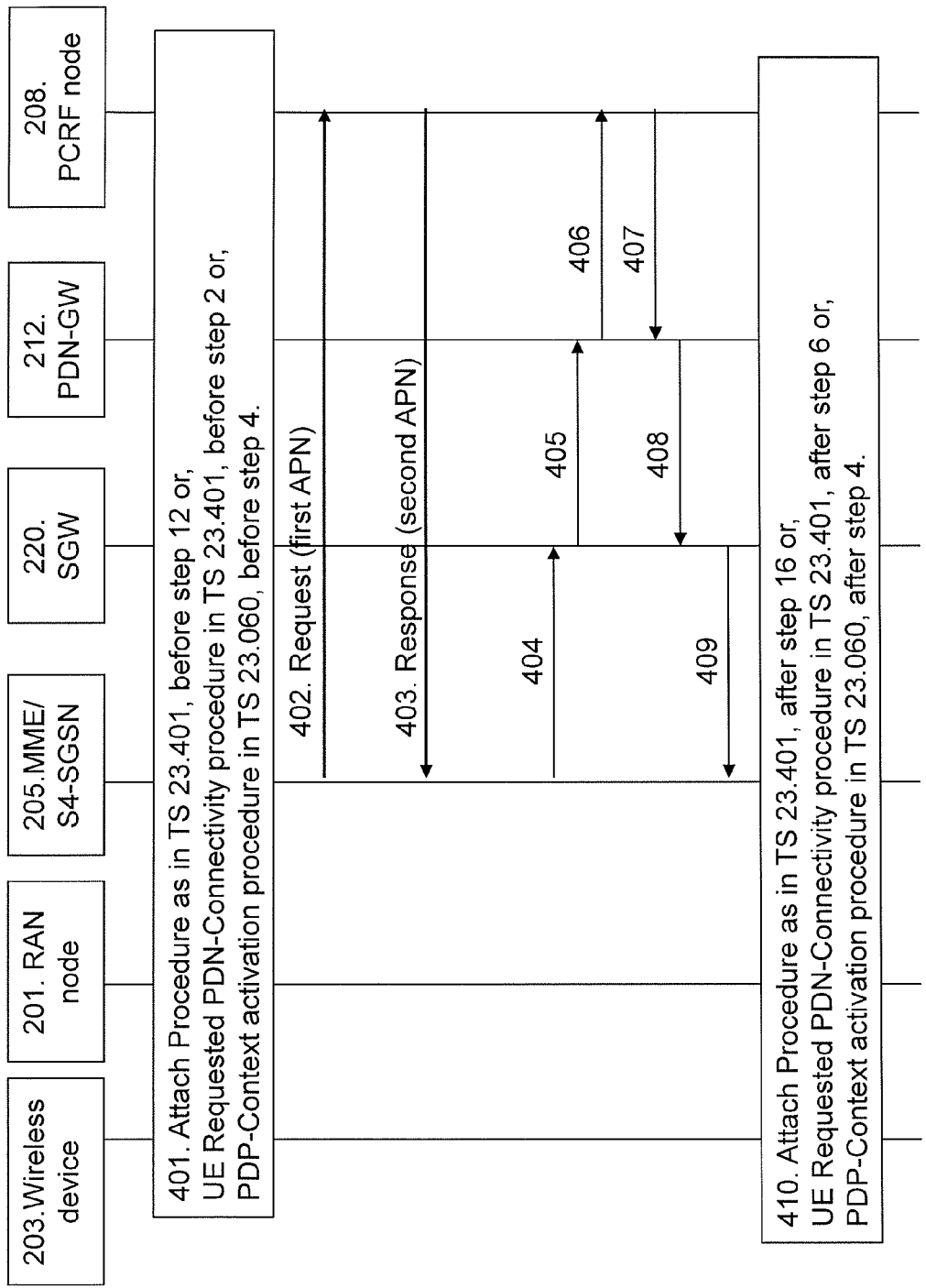
FIG. 4 is a signaling diagram illustrating embodiments of a method.

An embodiment for an attach/primary PDP-context activation method will now be described with reference to FIG. 4. In FIG. 4, the CN node 205 is represented by a combined MME/S4-SGSN and the gateway 212 is represented by a PDN-GW. In addition to the nodes seen in FIG. 2, FIG. 4 illustrates a Serving GateWay (SGW) 220. The method for attach/primary PDP-context activation in FIG. 4 comprises the following steps, which steps may be performed in any suitable order than described below:

Step 401

The wireless device 203 performs an attach procedure or an User Equipment (UE) Requested PDN-Connectivity procedure or a PDP-Context activation procedure. During this initial attach procedure the MME/SGSN obtains APN from the UE and/or HSS. The attach procedure may be an initial attach procedure.

An example of an attach procedure may be found in TS 23.401, V12.3.0. The attach procedure comprises steps 1-11 in figure 5.3.2.1-1 in chapter 5.3.2.1 of TS 23.401, V12.3.0. An example of a UE Requested PDN-Connectivity procedure may be found in TS 23.401, V12.3.0. The UE requested PDN-connectivity procedure comprises steps 1-2 in figure 5.10.2-1 in chapter 5.10.2 of TS 23.401, V12.3.0. An example of a PDP-Context activation procedure may be found in TS 23.060, V12.3.0, i.e. in steps 1-3 in figures 63 and 63 in chapter 9.2.2.1 of TS 23.060, V12.3.0.

Step 402

Figure 3:
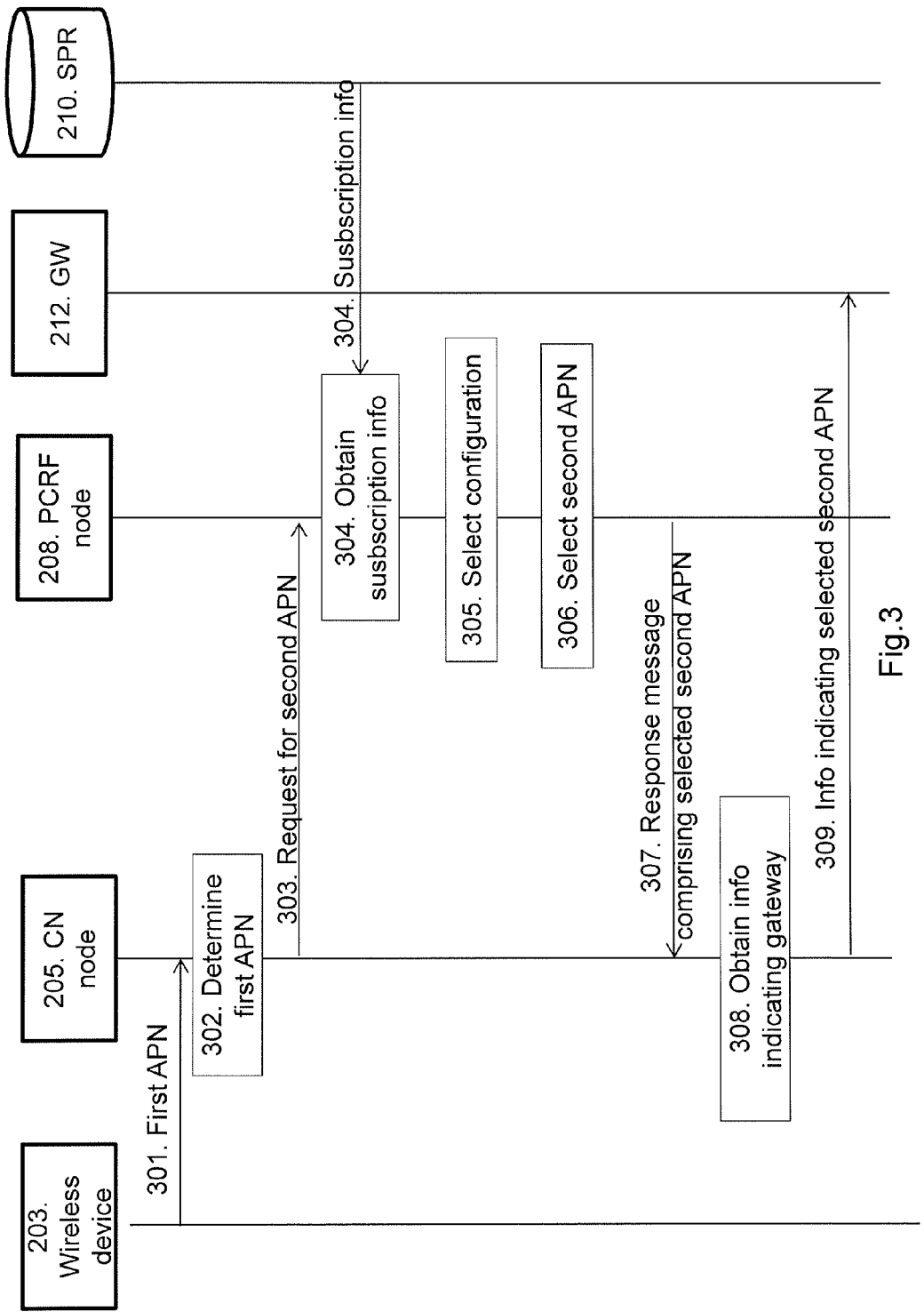
FIG. 3 is a signaling diagram illustrating embodiments of a method.

This step corresponds to step 303 in FIG. 3. The first APN is forwarded by the MME/S4-SGSN 205 to the PCRF node 208 over the direct interface 220.

Step 403

This step corresponds to step 307 in FIG. 3. The PCRF node 208 decides, based on policies and considering subscription information retrieved from the SPR 210, the recommended APN to be used, i.e. the second APN, and provides this in a response back to the MME/S4-SGSN 205. It is assumed that the PCRF 208 holds information on which second APN that is optimal to select on the functionality required by the PDN-GW.

Step 404

The MME/S4-SGSN 205 sends a Create Session Request to the SGW 220 and includes the second APN received from the PCRF node 208.

Step 405

The SGW 220 sends a Create Session Request to the PDN-GW 212. The PDN-GW 212 receives the request and directs the PDN-connection to the second APN (selected by the PCRF node 208).

Step 406

The PDN-GW 212 initiates a new Gx session towards the PCRF node 208 including the second APN.

Step 407

The PCRF node 208 recognizes the second APN and binds the Sx session with the Gx session. The PCRF node 208 then responds to the Gx session request to the PDN-GW 212.

Step 408

The PDN-GW 212 sends a Create Session Response to the SGW 220.

Step 409

The SGW 220 sends a Create Session Response to the MME/S4-SGSN 205.

Step 410

Figure 5:
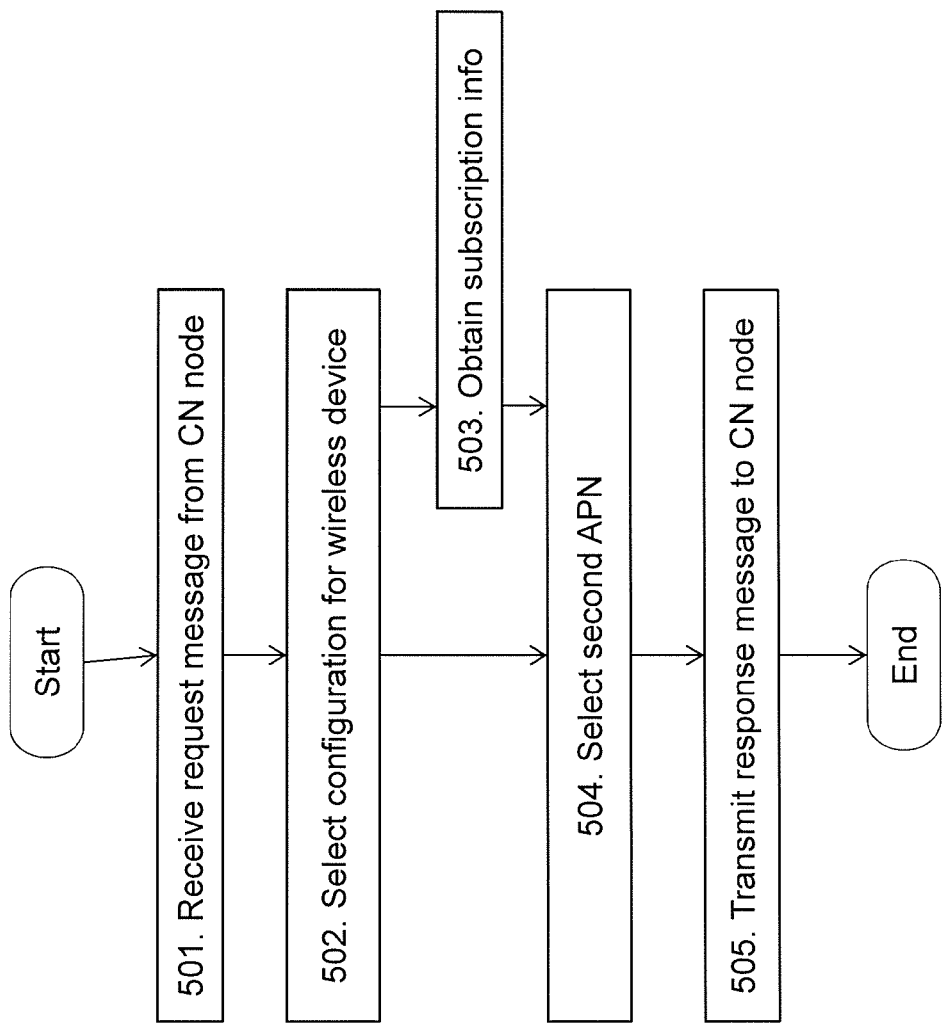
FIG. 5 is a flow chart illustrating embodiments of a method in a PCRF node.

In case of an Initial attach procedure this continues after step 16 in figure 5.3.2.1-1 in chapter 5.3.2.1 of 3GPP TS 23.401, V12.3.0. In case of a UE Requested PDN-Connectivity procedure it continues after step 6 in figure 5.10.2-1 in chapter 5.10.2 of TS 23.401 V12.3.0. In case of a PDP-Context activation procedure it continues after step 4 in figures 63 and 63 in chapter 9.2.2.1 of 3GPP TS 23.060, V12.3.0.

The embodiments illustrated in FIG. 4 also comprises steps corresponding to steps 301-302, steps 304-306 and steps 308-309 in FIG. 3, but they are not repeated in FIG. 4 for the sake of simplicity.

The method described above will now be described seen from the perspective of the PCRF node 208. FIG. 5 is a flowchart describing the present method in the PCRF node 208 for handling APNs. The method comprises the following steps to be performed by the PCRF node 208, which steps may be performed in any suitable order than described below:

Step 501

This step corresponds to step 303 in FIG. 3 and step 402 in FIG. 4.

The PCRF node 208 receives, from the CN node 205, a request message comprising information indicating a first APN associated with a packet data connection. The request message is a request for a second APN being configured for a wireless device 203 arranged to communicate via the packet data connection.

In some embodiments, the first APN is associated with a plurality of gateways 212.

The first APN may be selected by the wireless device 203 or by the CN node 205.

The request message may be received and the response message may be transmitted using the direct interface 220 between the PCRF node 208 and the CN node 205.

The packet data connection may be a PDN connection or a PDP context.

The CN node 205 may be one of: a MME, a SGSN, a combined MME and SGSN node and a TWAG.

Step 502

This step corresponds to step 305 in FIG. 3. The PCRF node 208 selects a configuration for the wireless device 203.

Step 503

This step corresponds to step 304 in FIG. 3. In some embodiments, the PCRF node 208 obtains subscription information associated with the wireless device 203. The subscription information may be obtained from the SPR 210.

Step 504

This step corresponds to step 306 in FIG. 3 and step 403 in FIG. 4. The PCRF node 208 selects the second APN adapted to the selected configuration from a plurality of candidate second APNs. Each candidate second APN in the plurality comprises different configurations for the same packet data connection.

In an embodiment where the first APN is associated with a plurality of gateways 212, the second APN may be selected to be an APN which is associated with one of the plurality gateways 212 for the packet data connection.

The second APN may be selected based on at least one of the subscription information obtained in step 503 and other parameters associated with the wireless device 203.

Step 505

This step corresponds to step 307 in FIG. 3 and step 404 in FIG. 4. The PCRF Node 208 transmits a response message to the CN node 205. The response message comprises information indicating the selected second APN.

To perform the method steps shown in FIG. 5 for handling APNs, the PCRF node 208 is adapted to receive, from the CN node 205, a request message comprising information indicating a first APN associated with a packet data connection. The request message is a request for a second APN being configured for a wireless device 203 arranged to communicate via the packet data connection. The first APN may be selected by the wireless device 203 or by the CN node 205. The request message may be received and the response message may be transmitted using the direct interface 220 between the PCRF node 208 and the CN node 205. The packet data connection may be a PDN connection or a PDP context. The CN node 205 may be one of: a MME, a SGSN, a combined MME and SGSN node and a TWAG.

The PCRF node 208 may be adapted to obtain subscription information associated with the wireless device 203. The subscription information may be obtained from the SPR 210.

The PCRF node 208 is further adapted to select a configuration for the wireless device 203 and to select the second APN adapted to the selected configuration from a plurality of candidate second APNs. Each candidate second APN in the plurality comprises different configurations for the same packet data connection. In some embodiments, the first APN is associated with a plurality of gateways 212, and the second APN may be selected to be an APN which is associated with one of the plurality gateways 212 for the packet data connection. The second APN is selected based on at least one of the subscription information and other parameters associated with the wireless device 203.

The PCRF node 208 is further adapted to transmit a response message to the CN node 205. The response message comprises information indicating the selected second APN.

In some embodiments, the PCRF node 208 comprises processing means which is adapted to perform the steps of the method seen in FIG. 5. The processing means may comprise a processor 601 and a memory 603 as seen in FIG. 6, and the memory 603 may comprise instructions executable by the processor 601.

Figure 6:
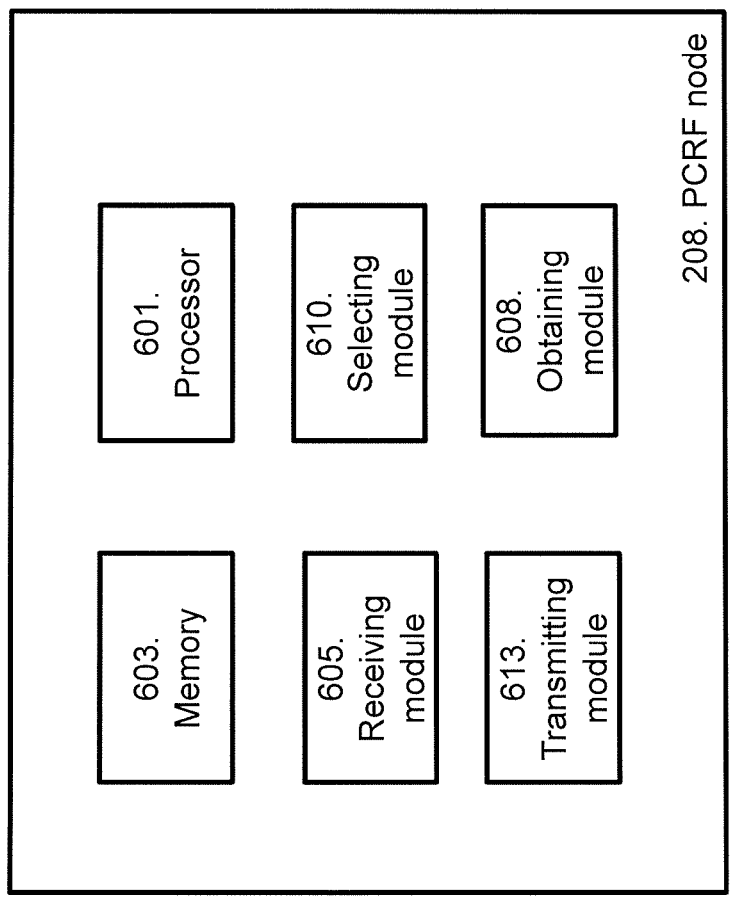
FIG. 6 is a schematic block diagram illustrating embodiments of a PCRF node.

To perform the method steps shown in FIG. 5 for handling APNs, the PCRF node 208 may comprise an arrangement as illustrated in FIG. 6. The PCRF node 208 may comprise a receiving module 605 which is adapted to receive, from the CN node 205, a request message comprising information indicating a first APN associated with a packet data connection. The request message is a request for a second APN being configured for a wireless device 203 arranged to communicate via the packet data connection. The first APN may be selected by the wireless device 203 or by the CN node 205. The request message may be received using the direct interface 220 between the PCRF node 208 and the CN node 205. The packet data connection may be a PDN connection or a PDP context. The CN node 205 may be one of: a MME, a SGSN, a combined MME and SGSN node and a TWAG. The receiving module 605 may also be referred to as a receiving circuit, a receiving unit, a receiving means or a means to receive. The receiving module 605 may be a receiver or a transceiver etc.

The PCRF node 208 may comprise an obtaining module 608 adapted to obtain subscription information associated with the wireless device 203. The subscription information may be obtained from the SPR 210. The obtaining module 608 may also be referred to as an obtaining circuit, an obtaining unit, an obtaining means or a means to obtain.

The PCRF node 208 may further comprise a selecting module 610 which is adapted to select a configuration for the wireless device 203 and to select the second APN adapted to the selected configuration from a plurality of candidate second APNs. Each candidate second APN in the plurality comprises different configurations for the same packet data connection. In some embodiments, the first APN is associated with a plurality of gateways 212, and the second APN may be selected to be an APN which is associated with one of the plurality gateways 212 for the packet data connection. The second APN may be selected based on at least one of the subscription information and other parameters associated with the wireless device 203. The selecting module 610 may also be referred to as a selecting circuit, a selecting unit, a selecting means or a means to select.

The PCRF node 208 may further comprise a transmitting module 613 adapted to transmit a response message to the CN node 205. The response message comprises information indicating the selected second APN. The response message may be transmitted using the direct interface 220. The transmitting module 613 may also be referred to as a transmitting circuit, a transmitting unit, a transmitting means or a means to transmit. The transmitting module 613 may be a transmitter or a transceiver etc.

The memory 603 mentioned above, comprises one or more memory units. The memory 603 is arranged to be used to store data, received data streams, power level measurements, information indicating first APN and information indicating second APN, request messages, candidate APNs, information indicating gateways, subscription information, response messages, threshold values, time periods, configurations, schedulings, and applications to perform the methods herein when being executed in the PROF node 208. The memory 603 may also be referred to as a memory circuit, a memory unit, a memory means or means to store.

A computer program product or a computer program may be directly loadable into an internal memory of a digital computer within at least one entity of the PCRF node 208 described above. The computer program product comprises software code portions for performing the method according to any one the steps described in relation to and seen in FIG. 5 when said product is run on a computer.

A computer program product or a computer program may be stored on a computer usable medium. The computer program product may comprise a computer readable program for causing a computer, within an entity in the PCRF node 208 described above, to control an execution of the method according to any one of the steps seen and described in relation to FIG. 5.

Those skilled in the art will also appreciate that the receiving module 605, the obtaining module 608, the selecting module 610 and the transmitting module 613 described above may refer to a combination of analog and digital circuits, and/or one or more processors configured with software and/or firmware, e.g. stored in a memory, that when executed by the one or more processors such as the processor 601 perform as described above.

Figure 7:
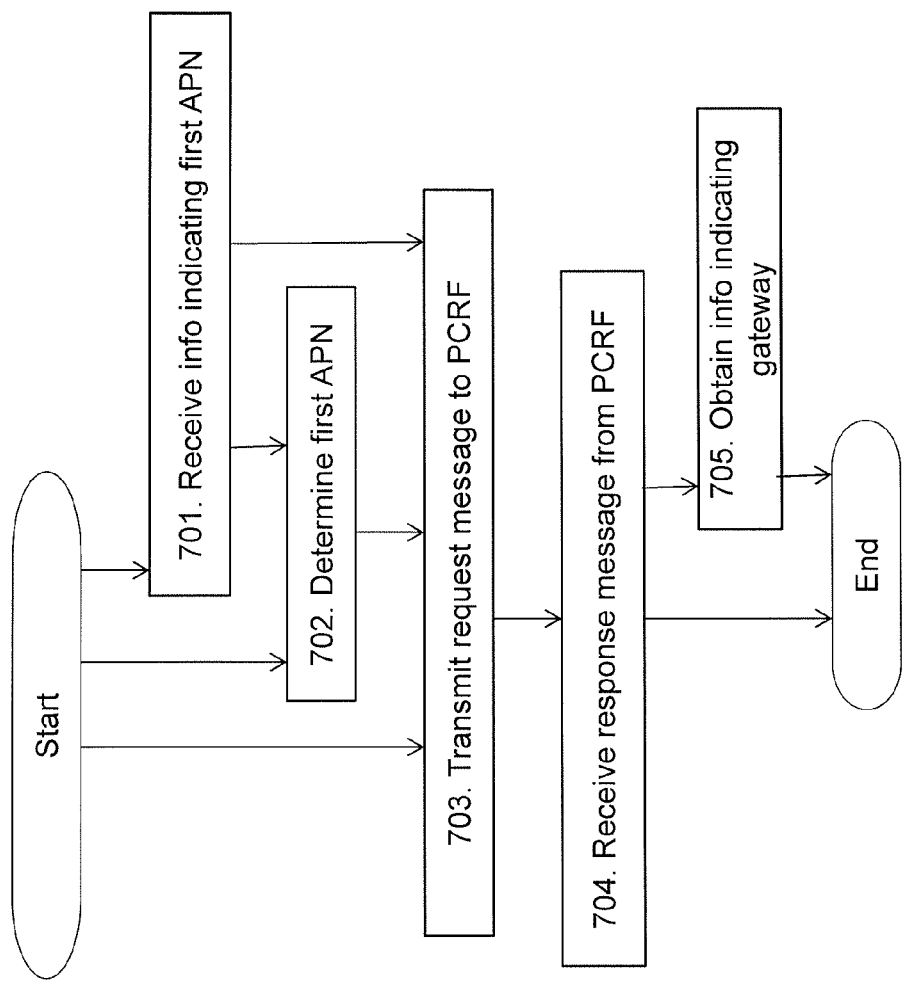
FIG. 7 is a flow chart illustrating embodiments of a method in a CN node.

The method described above will now be described seen from the perspective of the CN node 205. FIG. 7 is a flowchart describing the present method in the CN node 205 for handling APNs. The CN node 205 may be one of: a MME, a SGSN, a combined MME and SGSN node and a TWAG. The method comprises the following steps to be performed by the CN node 205, which steps may be performed in any suitable order than described below:

Step 701

This step corresponds to step 301 in FIG. 3. In some embodiments, the CN node 205 receives the information indicating the first APN from the wireless device 203.

Step 702

This step corresponds to step 302 in FIG. 3. In some embodiments and based on at least one of policies and the information received from the wireless device 203, the CN node 205 determines the first APN to be transmitted in the request message.

Step 703

This step corresponds to step 303 in FIG. 3 and step 402 in FIG. 4. The CN node 205 transmits, to the PCRF node 208, a request message comprising information indicating a first APN associated with a packet data connection. The request message is a request for a second APN being configured for a wireless device 203 arranged to communicate via the packet data connection.

The request message may be transmitted using the direct interface 220 between the PCRF node 208 and the CN node 205.

The packet data connection may be a PDN connection or a PDP context.

Step 704

This step corresponds to step 307 in FIG. 3 and step 404 in FIG. 4. The CN Node 205 receives a response message from the PCRF node 208. The response message comprises information indicating a selected second APN. The response message may be received using a direct interface 220 between the PCRF node 208 and the CN node 205.

Step 705

This step corresponds to step 308 in FIG. 3. In some embodiments, the CN node 205 obtains, for the packet data connection, information indicating a gateway node 212 based on the selected second APN received from the PCRF node 208. The gateway node 212 is to be the gateway for the communication of the wireless device 203 via the packet data connection.

To perform the method steps in FIG. 7, the CN node 205 is adapted to transmit, to the PCRF node 208, a request message comprising information indicating a first APN associated with a packet data connection. The request message is a request for a second APN being configured for a wireless device 203 arranged to communicate via the packet data connection. The request message may be transmitted using the direct interface 220 between the PCRF node 208 and the CN node 205. The packet data connection may be a PDN connection or a PDP context. As mentioned above, the CN node 205 may be one of: a MME, a SGSN, a combined MME and SGSN node and a TWAG.

The CN node 205 is further adapted to receive a response message from the PCRF node 208. The response message comprises information indicating a selected second APN. The response message may be received using the direct interface 220 between the PCRF node 208 and the CN node 205.

In some embodiments, the CN node 205 is further adapted to receive the information indicating the first APN from the wireless device 203.

The CN node 205 may be further adapted to, based on at least one of policies and the information received from the wireless device 203, determine the first APN to be transmitted in the request message.

In some embodiments, the CN node 205 may be adapted to obtain, for the packet data connection, information indicating a gateway node 212 based on the selected second APN received from the PCRF node 208. The gateway node 212 is to be the gateway for the communication of the wireless device 203 via the packet data connection.

In some embodiments, the CN node 205 comprises processing means which is adapted to perform the steps of the method seen in FIG. 7. The processing means may comprise a processor 801 and a memory 803 as seen in FIG. 8, and the memory 803 may comprise instructions executable by the processor 801.

Figure 8:
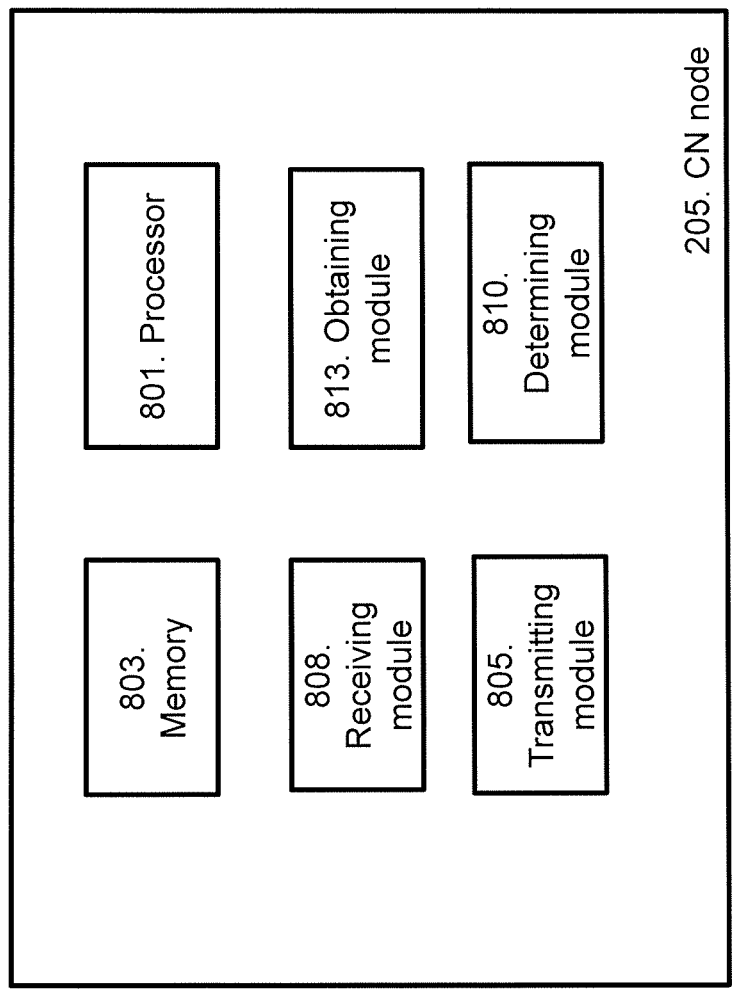
FIG. 8 is a schematic block diagram illustrating embodiments of a CN node.

To perform the method steps shown in FIG. 7 for handling APNs, the CN node 205 may comprise an arrangement as illustrated in FIG. 8. The CN node 205 may be one of: a MME, a SGSN, a combined MME and SGSN node and a TWAG.

The CN Node 205 may comprise a transmitting module 805 adapted to transmit, to a PCRF node 208, a request message comprising information indicating a first APN associated with a packet data connection. The request message is a request for a second APN being configured for a wireless device 203 arranged to communicate via the packet data connection. The request message may be transmitted using the direct interface 220 between the PCRF node 208 and the CN node 205. The packet data connection may be a PDN connection or a PDP context. The transmitting module 805 may also be referred to as a transmitting circuit, a transmitting unit, a transmitting means or means to transmit. The transmitting module 805 may be a transmitter or a transceiver.

The CN node 205 may comprise a receiving module 808 adapted to receive a response message from the PCRF node 208. The response message comprises information indicating a selected second APN. The receiving module 808 may be further adapted to receive the information indicating the first APN from the wireless device 203. The response message may be received using the direct interface 220 between the PCRF node 208 and the CN node 205. The receiving module 808 may also be referred to as a receiving circuit, a receiving unit, a receiving means or means to receive. The receiving module 808 may be a receiver or a transceiver.

The CN node 205 may comprise a determining module 810 which is adapted to, based on at least one of policies and the information received from the wireless device 203, determine the first APN to be transmitted in the request message. The determining module 810 may also be referred to as a determining circuit, a determining unit, a determining means or means to determine.

The CN node 205 may comprise a obtaining module 813 adapted to obtain, for the packet data connection, information indicating a gateway node 212 based on the selected second APN received from the PCRF node 208. The gateway node 212 is to be the gateway for the communication of the wireless device 203 via the packet data connection. The obtaining module 813 may also be referred to as an obtaining circuit, an obtaining unit, an obtaining means or means to obtain.

The memory 803 mentioned above, comprises one or more memory units. The memory 803 is arranged to be used to store data, received data streams, power level measurements, information indicating first APN and information indicating second APN, request messages, candidate APNs, information indicating gateways, subscription information, response messages, threshold values, time periods, configurations, schedulings, and applications to perform the methods herein when being executed in the CN node 205. The memory 803 may also be referred to as a memory circuit, a memory unit, a memory means or means to store.

A computer program product or a computer program may be directly loadable into an internal memory of a digital computer within at least one entity of the CN node 205 described above. The computer program product comprises software code portions for performing the method according to any one of the steps described in relation to and seen in FIG. 7 when said product is run on a computer.

A computer program product or a computer program may be stored on a computer usable medium. The computer program product may comprise a computer readable program for causing a computer, within an entity in the CN node 205 described above, to control an execution of the method according to any one of the steps seen and described in relation to FIG. 7.

Those skilled in the art will also appreciate that the receiving module 808, the determining module 810, the obtaining module 813 and the transmitting module 805 described above may refer to a combination of analog and digital circuits, and/or one or more processors configured with software and/or firmware, e.g. stored in a memory, that when executed by the one or more processors such as the processor 801 perform as described above.

The present mechanism for handling APNs may be implemented through one or more processors, such as the processor 601 in the PCRF node arrangement depicted in FIG. 6 and a processor 801 in the CN node arrangement depicted in FIG. 8, together with computer program code for performing the functions of the embodiments herein. The processor may be for example a Digital Signal Processor (DSP), Application Specific Integrated Circuit (ASIC) processor, Field-programmable gate array (FPGA) processor or microprocessor. The program code mentioned above may also be provided as a computer program product, for instance in the form of a data carrier carrying computer program code for performing the embodiments herein when being loaded into at least one of the PCRF node 208 and CN node 205. One such carrier may be in the form of a CD ROM disc. It is however feasible with other data carriers such as a memory stick. The computer program code can furthermore be provided as pure program code on a server and downloaded to at least one of the PCRF node 208 and CN node 205.

Some embodiments will now be summarized. As mentioned above, a number of functionalities may be configured per APN in the PDN-GW and the TDF. With the current technology, in case some users that may access a certain APN also may use a certain function, then this function must be enabled. Thus, the current technology provides a sub-optimal solution from a performance point of view since not all users would benefit from the function (and it may be a rather low fraction of users that actually do benefit from the function). However, the embodiments herein provides an optimal solution from a performance point of view since multiple second APNs may be configured in the gateway 212, e.g. the PDN-GW/GGSN or TDF, to reach the same destination PDN on Gi/SGi, but with different configurations e.g. with different functions enabled/disabled, such as PISC, Online Charging etc. The first APN used in the gateway 212, e.g. PDN-GW/GGSN or TDF, may be selected based on policies so that a configured second APN with functionality optimized for each packet data connection, e.g. PDN-connection or PDP-context, is selected.

The PCRF node 208 is allowed to assist the CN node 205, e.g. MME/SGSN, in the APN selection through the use of an external direct interface 220 between the CN node 205 and the PCRF node 208. In principle the CN node 205 may provide over this interface 220, the APN from the wireless device 203 or HSS and then to let the PCRF node 208 elect an optimized second APN for the PDN-connection/PDP-context in the response back to the CN node 205. The second APN selected by the PCRF node 208 may then be indicated in a request message such as e.g. the Create Session Request/PDP-context Activation Request towards the (SGW and) PDN-GW/GGSN. As explained earlier, the CN node 205, e.g. the MME-SGSN, is already involved in the APN selection for the default bearer/primary PDP-contexts. The embodiments herein are expected to take place after the standardized APN selection in the CN node 205.

Since the PCRF node 208 has superior knowledge about the functional needs of each packet data connection, e.g. PDN-connection or PDP-context, the embodiments herein would provide maximum flexibility. This would allow the PCRF node 208 to direct the packet data connection to a second APN that may or may not be configured for e.g.:

Content filtering
Online Charging (or Offline Charging)
Packet forwarding to a (specific) gateway.
PISC for PCC or other purposes (e.g. statistics).
Etc.

The embodiments herein are not limited to the above described embodiments. Various alternatives, modifications and equivalents may be used. Therefore, the above embodiments should not be taken as limiting the scope of the embodiments, which is defined by the appending claims.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements. The term "configured to" used herein may also be referred to as "arranged to" or "adapted to".

It should also be emphasised that the steps of the methods defined in the appended claims may, without departing from the embodiments herein, be performed in another order than the order in which they appear in the claims.

The invention claimed is:

1. A method in a Policy and Charging Rules Function (PCRF) node for handling Access Point Names (APNs), the method comprising:
   the PCRF receiving, from a Core Network (CN) node, a request message comprising information indicating a first APN associated with a packet data connection, and wherein the request message is a request for a second APN being configured for a wireless device arranged to communicate via the packet data connection;
   the PCRF selecting, from a plurality of wireless device configurations, a configuration for the wireless device, wherein the plurality of wireless device configurations includes at least three wireless device configurations for the wireless device;
   after selecting the configuration for the wireless device, the PCRF selecting, from a plurality of candidate second APNs, the second APN adapted to the selected configuration, wherein each candidate second APN in the plurality of candidate second APNs comprises different configurations with respect to each other for the same packet data connection, wherein each candidate second APN is a separate entity; and
   the PCRF transmitting a response message to the CN node, wherein the response message comprises information indicating the selected second APN.

2. The method according to claim 1, wherein the first APN is associated with a plurality of gateways, and wherein the second APN is selected to be an APN which is associated with one of the plurality of gateways for the packet data connection.

3. The method according to claim 1, further comprising:
   obtaining subscription information associated with the wireless device, wherein the second APN is selected based on at least one of the subscription information and other parameters associated with the wireless device.

4. The method according to claim 3, wherein the subscription information is obtained from a Subscriber Profile Repository (SPR).

5. The method according to claim 1, wherein the first APN is selected by the wireless device or by the CN node.

6. The method according to claim 1, wherein the request message is received and the response message is transmitted using a direct interface between the PCRF node and the CN node.

7. The method according to claim 1, wherein the packet data connection is a Packet Data Network (PDN) connection or a Packet Data Protocol (PDP) context.

8. The method according to claim 1, wherein the CN node is one of: a Mobility Management Entity (MME), a Serving General packet radio service Support Node (SGSN), a combined MME and SGSN node, and a Trusted Wireless local area network Access Gateway (TWAG).

9. The method of claim 1, wherein the selected configuration corresponds to one or more of a configuration for content filtering, online charging, offline charging, packet forwarding to a Traffic Detection Function (TDF) packet inspection, quality of service, bandwidth control, header enrichment, transport optimization, content optimization, access-control, measurements, monitoring, and security.

10. The method of claim 1, wherein the plurality of wireless device configurations includes a combination of three or more of content filtering, online charging, offline charging, packet forwarding to a Traffic Detection Function (TDF) packet inspection, quality of service, bandwidth control, header enrichment, transport optimization, content optimization, access-control, measurements, monitoring, and security.

11. A method in a Core Network (CN) node for handling Access Point Names (APNs), the method comprising:
   transmitting, to a Policy and Charging Rules Function (PCRF) node, a request message comprising information indicating a first APN associated with a packet data connection, and wherein the request message is a request for a second APN being configured for a wireless device arranged to communicate via the packet data connection; and
   receiving a response message from the PCRF node, wherein the response message comprises information indicating a selected second APN that is selected based on (i) a selection of a configuration for the wireless device from a plurality of wireless device configurations, and (ii) after the selection of the configuration for the wireless device, a selection of the second APN from a plurality of candidate second APNs,
   wherein the selected second APN is adapted to the selected configuration for the wireless device,
   wherein the plurality of wireless device configurations includes at least three wireless device configurations for the wireless device,
   wherein each candidate second APN is a separate entity, and
   wherein each candidate second APN in the plurality of candidate second APNs comprises different configurations with respect to each other for the same packet data connection.

12. The method according to claim 11, further comprising:
   receiving the information indicating the first APN from the wireless device.

13. The method according to claim 12, further comprising:
   based on at least one of policies and the information received from the wireless device, determining the first APN to be transmitted in the request message.

14. The method according to claim 11, further comprising:
   obtaining, for the packet data connection, information indicating a gateway node based on the selected second APN received from the PCRF node, and which gateway node is to be the gateway for the communication of the wireless device via the packet data connection.

15. The method according to claim 11, wherein the request message is transmitted and the response message is received using a direct interface between the PCRF node and the CN node.

16. The method according to claim 11, wherein the packet data connection is a Packet Data Network (PDN) connection or a Packet Data Protocol (PDP) context.

17. The method according to claim 11, wherein the CN node is one of: a Mobility Management Entity (MME), a Serving General packet radio service Support Node (SGSN), a combined MME and SGSN node and a Trusted Wireless local area network Access Gateway (TWAG).

18. A Policy and Charging Rules Function (PCRF) node for handling Access Point Names (APNs) the PCRF node being adapted to:
   receive, from a Core Network (CN) node, a request message comprising information indicating a first APN associated with a packet data connection, and wherein the request message is a request for a second APN being configured for a wireless device arranged to communicate via the packet data connection;
   select, from a plurality of wireless device configurations, a configuration for the wireless device, wherein the plurality of wireless device configurations includes at least three wireless device configurations for the wireless device;
   after the selection of the configuration for the wireless device, select, from a plurality of candidate second APNs, the second APN adapted to the selected configuration from the plurality of candidate second APNs, wherein each candidate second APN in the plurality of candidate second APNs comprises different configurations with respect to each other for the same packet data connection, wherein each candidate second APN is a different entity; and
   transmit a response message to the CN node, wherein the response message comprises information indicating the selected second APN.

19. The PCRF node according to claim 18, wherein the first APN is associated with a plurality of gateways, and wherein the second APN is selected to be an APN which is associated with one of the plurality of gateways for the packet data connection.

20. A computer program product stored on a non-transitory computer usable medium, wherein the computer program product comprises a computer readable program for causing a computer, within an entity in the PCRF node according to claim 18, to:
   receive, from a Core Network (CN) node, a request message comprising information indicating a first APN associated with a packet data connection, and wherein the request message is a request for a second APN being configured for a wireless device arranged to communicate via the packet data connection;
   select a configuration for the wireless device;
   select the second APN adapted to the selected configuration from a plurality of candidate second APNs, wherein each candidate second APN comprises different configurations for the same packet data connection; and
   transmit a response message to the CN node, wherein the response message comprises information indicating the selected second APN.

21. A Core Network (CN) node for handling Access Point Names (APNs), the CN node being adapted to:
   transmit, to a Policy and Charging Rules Function (PCRF) node, a request message comprising information indicating a first APN associated with a packet data connection, and wherein the request message is a request for a second APN being configured for a wireless device arranged to communicate via the packet data connection; and receive a response message from the PCRF node, wherein the response message comprises information indicating a selected second APN that is selected based on (i) a selection of a configuration for the wireless device from a plurality of wireless device configurations, and (ii) after the selection of the configuration for the wireless device, a selection of the second APN from a plurality of candidate second APNs, wherein the selected second APN is adapted to the selected configuration for the wireless device, wherein the plurality of wireless device configurations includes at least three wireless device configurations for the wireless device, wherein each candidate second APN is a separate entity, and wherein each candidate second APN in the plurality of candidate second APNs comprises different configurations with respect to each other for the same packet data connection.

22. The CN node according to claim 21, further adapted to:

receive the information indicating the first APN from the wireless device.

23. A computer program product stored on a non-transitory computer usable medium, wherein the computer program product comprises a computer readable program for causing a computer, within an entity in the CN node according to claim 21, to:

transmit, to a Policy and Charging Rules Function (PCRF) node, a request message comprising information indicating a first APN associated with a packet data connection, and wherein the request message is a request for a second APN being configured for a wireless device arranged to communicate via the packet data connection; and receive a response message from the PCRF node, wherein the response message comprises information indicating a selected second APN.

24. A computer program product loadable into a non-transitory computer-readable memory, wherein the computer program product comprises software code portions for performing:

receiving, from a Core Network (CN) node, a request message comprising information indicating a first APN associated with a packet data connection, and wherein the request message is a request for a second APN being configured for a wireless device arranged to communicate via the packet data connection;

selecting, from a plurality of wireless device configurations, a configuration for the wireless device, wherein the plurality of wireless device configurations includes three or more configurations for the wireless device;

after selecting the configuration for the wireless device, the PCRF selecting, from a plurality of candidate second APNs, the second APN adapted to the selected configuration from a plurality of candidate second APNs, wherein each candidate second APN in the plurality of candidate second APNs comprises different configurations with respect to each other for the same packet data connection, wherein each candidate second APN is a separate entity; and transmitting a response message to the CN node, wherein the response message comprises information indicating the selected second APN.

25. A computer program product loadable into a non-transitory computer-readable memory, wherein the computer program product comprises software code portions for performing:

transmitting, to a Policy and Charging Rules Function (PCRF) node, a request message comprising information indicating a first APN associated with a packet data connection, and wherein the request message is a request for a second APN being configured for a wireless device arranged to communicate via the packet data connection; and receiving a response message from the PCRF node, wherein the response message comprises information indicating a selected second APN that is selected based on (i) a selection of a configuration for the wireless device from a plurality of wireless device configurations, and (ii) after the selection of the configuration for the wireless device, a selection of the second APN from a plurality of candidate second APNs, wherein the selected second APN is adapted to the selected configuration for the wireless device, wherein the plurality of wireless device configurations includes at least three wireless device configurations for the wireless device, wherein each candidate second APN is a separate entity, and wherein each candidate second APN in the plurality of candidate second APNs comprises different configurations with respect to each other for the same packet data connection.

* * * * *